(12) United States Patent
Nook et al.

(10) Patent No.: US 12,126,166 B2
(45) Date of Patent: Oct. 22, 2024

(54) JUMP STARTING DEVICE WITH ENHANCED (TURBO) BOOST MODE

(71) Applicant: THE NOCO COMPANY, Glenwillow, OH (US)

(72) Inventors: Jonathan Lewis Nook, Gates Mills, OH (US); Derek Michael Underhill, Tempe, AZ (US); James Richard Stanfield, Glendale, AZ (US)

(73) Assignee: The NOCO Company, Glenwillow, OH (US)

( * ) Notice: Subject to any disclaimer, the term of this patent is extended or adjusted under 35 U.S.C. 154(b) by 87 days.

(21) Appl. No.: 17/759,407

(22) PCT Filed: Jan. 4, 2021

(86) PCT No.: PCT/US2021/012119
§ 371 (c)(1),
(2) Date: Jul. 25, 2022

(87) PCT Pub. No.: WO2021/154461
PCT Pub. Date: Aug. 5, 2021

(65) Prior Publication Data
US 2023/0054189 A1 Feb. 23, 2023

Related U.S. Application Data

(60) Provisional application No. 62/966,766, filed on Jan. 28, 2020.

(51) Int. Cl.
*H02J 1/10* (2006.01)
*H01M 10/0525* (2010.01)
(Continued)

(52) U.S. Cl.
CPC ......... *H02J 1/122* (2020.01); *H01M 10/0525* (2013.01); *H01M 10/4257* (2013.01);
(Continued)

(58) Field of Classification Search
CPC ........ H02J 1/122; H02J 7/0013; H02J 7/0014; H02J 7/342; H01M 10/0525; H01M 10/4257; H01M 10/46
See application file for complete search history.

(56) References Cited

U.S. PATENT DOCUMENTS

| | | |
|---|---|---|
| 2013/0063091 A1 | 3/2013 | Nishi et al. |
| 2017/0373519 A1 | 12/2017 | Lei |

(Continued)

FOREIGN PATENT DOCUMENTS

| | | |
|---|---|---|
| CN | 102934316 | 2/2013 |
| DE | 10361743 | 9/2004 |

(Continued)

OTHER PUBLICATIONS

Japan Patent Office, Appl. 2022-545786, Notification of Reasons for Refusal, Aug. 29, 2023.

(Continued)

*Primary Examiner* — Jeffrey M Shin
(74) *Attorney, Agent, or Firm* — Jones Day

(57) ABSTRACT

Provided is a jump starting device for boosting a depleted or discharged battery having a positive terminal and negative terminal, including a battery device including multiple battery cells connected together in series, a positive battery connector for connecting the positive terminal of the battery device to the positive terminal of the depleted or discharge battery, a negative battery connector for connecting the negative terminal of the battery device battery to the negative terminal of the depleted or discharged battery, and electronics in circuit with the battery device, positive battery connector, and negative battery connector, the electronic configured for selectively connecting at least one or more (Continued)

battery cells of the battery device to the depleted or discharge battery in a normal boost mode or in an enhanced boost mode.

4 Claims, 2 Drawing Sheets

(51) Int. Cl.
   *H01M 10/42* (2006.01)
   *H01M 10/46* (2006.01)
   *H02J 7/00* (2006.01)

(52) U.S. Cl.
   CPC .......... *H01M 10/46* (2013.01); *H02J 7/0013* (2013.01); *H01M 2220/20* (2013.01)

(56) References Cited

U.S. PATENT DOCUMENTS

2019/0052107 A1    2/2019  Park
2019/0173305 A1    6/2019  Nook et al.
2020/0067333 A1*   2/2020  Wekwert .................. H02J 1/122

FOREIGN PATENT DOCUMENTS

JP        2003-293919        10/2003
WO    WO 2019/060699         3/2019

OTHER PUBLICATIONS

Patent Cooperation Treaty, PCT/US2021/012119, International Search Report and Written Opinion of the International Searching Authority, dated Apr. 1, 2021.
IP India, Appl. 202237042086, Examination Report, dated Feb. 16, 2023.
IP Australia, Appl. 2021213039, Examination Report No. 1, Mar. 15, 2023.
Canadian Patent Office, Appl. 3,168,905, Examination Report, Sep. 8, 2023.
European Patent Office, Appl. 21748404.7, Extended European Search Report, Mar. 18, 2024.
IP Australia, Appl. 2023208159, Examination Report No. 1, Jun. 11, 2024.
UK Intellectual Property Office, Appl. GB2211056.3, Examination Repot, Jul. 12, 2024.
CNIPA, Appl. 202180011270.0, First Office Action, Jul. 25, 2024.

* cited by examiner

JUMP STARTING DEVICE WITH ENHANCED (TURBO) BOOST MODE

FIELD

The present invention is directed to a jump starting device for jump starting a depleted or discharged battery (e.g. vehicle battery). The jump starting device is provided or configured to operate in a normal boost mode or an enhanced boost mode (e.g. Turbo mode or Turbo Boost mode).

BACKGROUND

12V Li-ion jump starters have become popular in recent years because they are small, handheld, and powerful. The advantages of a 12V jump starter is the battery in the vehicle (e.g. car or truck) is also 12V so the two batteries equalize and minimize the current draw from the jump starter (e.g. boost device) battery, and therefore providing more jump starts between charges. The problem is sometimes, the 12V Boost battery energy is not sufficient for successful jump-starting. In those situations, it would be helpful to have a 16V Lithium battery inside the jump starter in place of the 12V. The main problem with the 16V battery is that it discharges much faster due to the high voltage compared to the vehicle battery (e.g. car or truck battery).

It would be beneficial to have a selectable 16V mode only for those hard to start situations so you get the benefit of both 12V Li-ion and 16V Li-ion.

SUMMARY

The present invention is directed to an improved jump starting device configured to provide two or more operating modes for charging or boosting a depleted or discharged battery. For example, the jump starting device can configured to provide a normal 12V operating mode and a Turbo Boost 16V operating mode of charging a depleted or discharged 12V battery. The Turbo Boost 16V operating mode provides more power to jump start difficult or highly discharged batteries.

Battery Cell Sharing

A single 16V battery (e.g. 16V Li-ion battery) can be used to provide standard 12V jump starts as well as 16V Turbo boost jumpstarting. As an example, three (3) cells (e.g. top three (3A) cells) of the 16V battery can be used for providing a 12V mode and all four (4) cells of the 16V battery can be used for a 16V Turbo mode or Turbo Boost mode. See FIG. 1 and description below.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the electronics comprises a first relay configured selectively connecting one or more battery cells of the battery device to the depleted or discharged battery, and a second relay for selectively connecting one or more additional battery cells of the battery device to the depleted or discharge battery to increase the voltage delivered to the depleted or discharged battery.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the electronics comprises a first relay configured selectively connecting one or more battery cells of the battery device to the depleted or discharged battery, and a second relay for selectively connecting one or more additional battery cells of the battery device to the depleted or discharge battery to increase the voltage delivered to the depleted or discharged battery, and further comprising a controller for selectively opening and closing, respectively, the first relay and second relay.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the battery device is a battery pack.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the battery device is a battery pack, wherein the battery pack is a 16V rechargeable battery pack having at least four (4) individual battery cells.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the battery device is a battery pack, wherein the battery pack is a 16V rechargeable battery pack having four (4) individual 4V battery cells.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the battery device is a battery pack, wherein the battery pack is a 16V rechargeable battery pack having at least four (4) individual battery cells, wherein the at least four (4) individual battery cells are Li-ion battery cells.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, wherein the battery device is a battery pack, wherein the battery pack is a 16V rechargeable battery pack having four (4) individual 4V battery cells, wherein the four (4) individual 4V battery cells are Li-ion battery cells.

The presently described subject matter is directed to a jump starting device for boosting a depleted or discharged battery having a positive terminal and negative terminal, the jump starting device comprising or consisting of: a battery device comprising multiple battery cells connected together in series, the battery device having a positive terminal and a negative terminal; a positive battery connector for connecting the positive terminal of the battery device to the positive terminal of the depleted or discharge battery; a negative battery connector for connecting the negative terminal of the battery device battery to the negative terminal of the depleted or discharged battery; and electronics in circuit with the battery device, positive battery connector, and negative battery connector, the electronic configured for selectively connecting at least one or more battery cells of the battery device to the depleted or discharge battery in a normal boost mode, or connecting the one or more battery cells and one or more additional battery cells of the battery device to the depleted or discharged battery in an enhanced boost mode, further comprising a first charger for charging the one or more battery cells of the battery device, and a second charger for charging the one or more additional battery cells of the battery device.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device or second battery to the positive terminal of the depleted or discharge battery; a negative battery connector for connecting a negative terminal of the first battery device or second battery device to the negative terminal of the depleted or discharged battery; and electronics in circuit with first battery device, second battery device, and negative battery device, the electronics configured for selectively connecting the first battery device to the depleted or discharge battery in a normal boost mode, or connecting the second battery device to the depleted or discharged battery in an enhanced boost mode.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device or second battery to the positive terminal of the depleted or discharge battery; a negative battery connector for connecting a negative terminal of the first battery device or second battery device to the negative terminal of the depleted or discharged battery; and electronics in circuit with first battery device, second battery device, and negative battery device, the electronics configured for selectively connecting the first battery device to the depleted or discharge battery in a normal boost mode, or connecting the second battery device to the depleted or discharged battery in an enhanced boost mode, wherein the electronics comprises a first relay configured selectively connecting the first battery device to the depleted or discharged battery, and a second relay for selectively connecting the second battery device to the depleted or discharge battery to increase the voltage delivered to the depleted or discharged battery.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device or second battery to the positive terminal of the depleted or discharge battery; a negative battery connector for connecting a negative terminal of the first battery device or second battery device to the negative terminal of the depleted or discharged battery; and electronics in circuit with first battery device, second battery device, and negative battery device, the electronics configured for selectively connecting the first battery device to the depleted or discharge battery in a normal boost mode, or connecting the second battery device to the depleted or discharged battery in an enhanced boost mode, wherein the electronics comprises a first relay configured selectively connecting the first battery device to the depleted or discharged battery, and a second relay for selectively connecting the second battery device to the depleted or discharge battery to increase the voltage delivered to the depleted or discharged battery, further comprising a controller connected to and controlling the first relay and second relay for selectively connecting the first battery device to the depleted or discharge battery or the second battery device to the depleted or discharged battery.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device or second battery to the positive terminal of the depleted or discharge battery; a negative battery connector for connecting a negative terminal of the first battery device or second battery device to the negative terminal of the depleted or discharged battery; and electronics in circuit with first battery device, second battery device, and negative battery device, the electronics configured for selectively connecting the first battery device to the depleted or discharge battery in a normal boost mode, or connecting the second battery device to the depleted or discharged battery in an enhanced boost mode, wherein the first battery device is a 12V battery pack having three (3) individual 4V battery cells and the second battery device is a 16V battery pack having four (4) individual 4V battery cells.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device and/or second battery to the positive terminal of the depleted or discharge battery; a negative battery connector for connecting a negative terminal of the first battery device and/or second battery device to the negative terminal of the depleted or discharged battery; and electronics in circuit with the first battery device, second battery device, and positive battery connector for selectively connecting the first battery device to the depleted or discharge battery in a normal boost mode, or connecting simultaneously both the first battery device and the second battery device to the depleted or discharged battery in an enhanced boost mode.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device and/or second battery to the positive terminal of the depleted or discharge battery; a negative battery connector for connecting a negative terminal of the first battery device and/or second battery device to the negative terminal of the depleted or discharged battery; and electronics in circuit with the first battery device, second battery device, and positive battery connector for selectively connecting the first battery device to the depleted or discharge battery in a normal boost mode, or connecting simultaneously both the first battery device and the second battery device to the depleted or discharged battery in an enhanced boost mode, wherein the electronics comprises a first relay configured selectively connecting the first battery device to the depleted or discharged battery, and a second relay for selectively connecting the second battery device to the depleted or discharge battery to increase the voltage delivered to the depleted or discharged battery.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device and/or second battery to the positive terminal of the depleted or discharge battery; a negative battery connector for connecting a negative terminal of the first battery device and/or second battery device to the negative terminal of the depleted or discharged battery; and electronics in circuit with the first battery device, second battery device, and positive battery connector for selectively connecting the first battery device to the depleted or discharge battery in a normal boost mode, or connecting simultaneously both the first battery device and the second battery device to the depleted or discharged battery in an enhanced boost mode, wherein the electronics comprises a first relay configured selectively connecting the first battery device to the depleted or discharged battery, and a second relay for selectively connecting the second battery device to the depleted or discharge battery to increase the voltage delivered to the depleted or discharged battery, further comprising a controller connected to and controlling the first relay and second relay for selectively connecting the first battery device to the depleted or discharge battery and/or the second battery device to the depleted or discharged battery.

The presently described subject matter is directed to a jump starting device for boosting a depleted or discharged battery having a positive terminal and negative terminal, the jump starting device comprising or consisting of: a first battery device; a second battery device; a positive battery connector for connecting a positive terminal of the first battery device and/or second battery to the positive terminal of the depleted or discharge battery; a negative battery connector for connecting a negative terminal of the first battery device and/or second battery device to the negative terminal of the depleted or discharged battery; and electronics in circuit with the first battery device, second battery device, and positive battery connector for selectively connecting the first battery device to the depleted or discharge battery in a normal boost mode, or connecting simultaneously both the first battery device and the second battery device to the depleted or discharged battery in an enhanced boost mode, wherein the electronics comprises a first relay configured selectively connecting the first battery device to the depleted or discharged battery, and a second relay for selectively connecting the second battery device to the depleted or discharge battery to increase the voltage delivered to the depleted or discharged battery, further comprising a controller connected to and controlling the first relay and second relay for selectively connecting the first battery device to the depleted or discharge battery and/or the second battery device to the depleted or discharged battery, wherein the first battery device is a 12V battery pack having three (3) individual 4V battery cells and the second battery device is a 4V battery pack having one (1) individual 4V battery cell.

DETAILED DESCRIPTION

Figure 1:
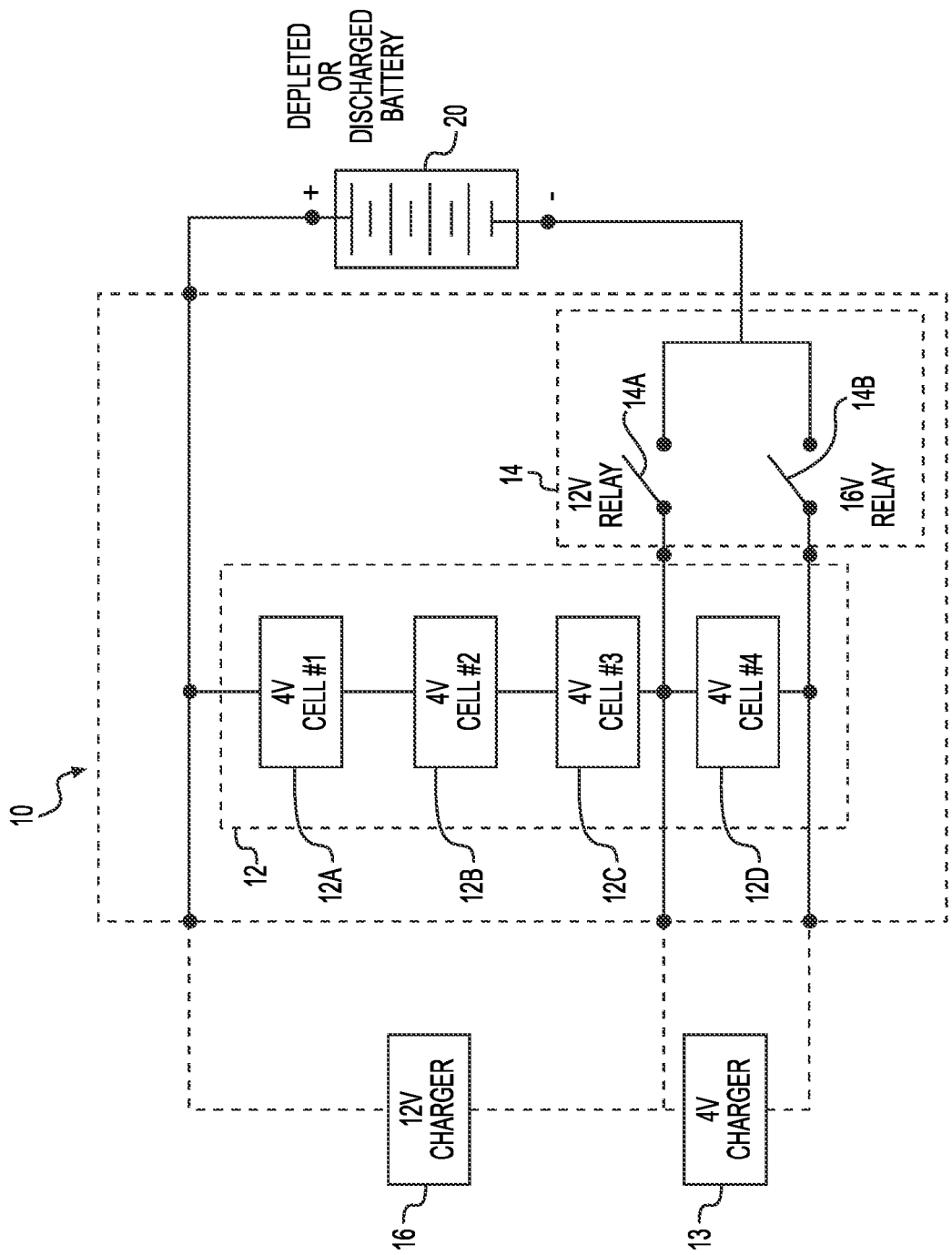
FIG. 1 is a circuit diagram of the jump starting device according to the present invention.

A jump starting device 10 according to the present invention is shown in FIG. 1. The jump starting device 10 comprises a battery device 12, a relay device 14 having a set of relays 14A, 14B, and conductors (e.g. wires, cables, conductive bars or plates, conductive frame, circuit board, battery terminal connectors, battery clamps, or combination thereof) for connecting the battery device of the jump starting device 10 to the depleted or discharged battery 20.

The battery device 12, for example, comprises four (4) rechargeable Li-ion 4V battery cells 12A, 12B, 12C, 12D (CELLS #1, 2, 3, 4) connected together in series. The battery device 12 includes a positive terminal and a negative terminal.

The relay device 14, for example, comprises a 12V relay 14A, a 16V relay 14B, and a controller for selectively operating (e.g. opening and closing) the relays 14A, 14B.

The battery device 12 of the jump starting device 10 can be charged using a 12V charger 16 and a 4V charger 18, as shown in FIG. 1. Specifically, the 12V charger 16 and charging circuit of the jump starting device 10 is configured to charge the battery cells 12A, 12B, 12C (CELLS #1, 2, 3). The 4V charger 18 and charging circuit of the jump starting device 10 is configured to charge the battery cell 12D (CELL #4).

Figure 2:
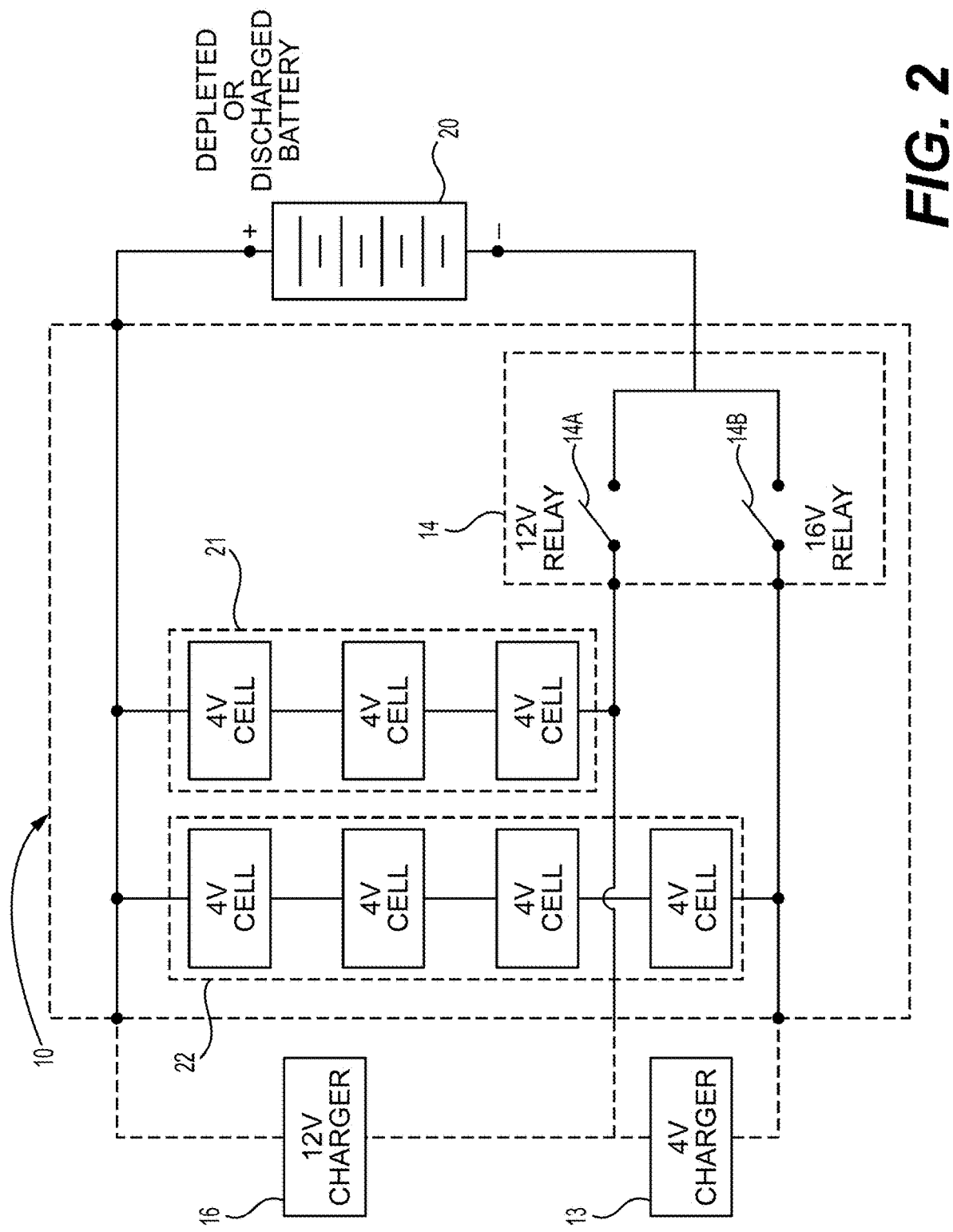
FIG. 2 is a circuit diagram of another example embodiment of the jump starting device.

FIG. 2 is a circuit diagram of another example embodiment of the jump starting device. The jump starting device 10 can be modified. For example, the battery device 12 shown in FIG. 1 and described above can be replaced with a separate 12V battery 21 and a separate 16V battery 22 selectively connected to the depleted or discharged battery 20 by the jump starting device 10 to provide a normal operating mode (i.e. normal mode) or a Turbo Boost operating mode (i.e. Turbo mode or Turbo Boost mode). Specifically, the separate 12V battery 21 is connected to the 12V relay 14A and the separate 16V battery 22 is connected to the 16V relay 14B.

Alternatively, the jump starting device can be modified in a different manner. For example, the battery device 12 shown in FIG. 1 and described above can be replaced with a separate 12V battery and a separate 4V battery selectively connected or selectively connected in combination to the depleted or discharged battery 20 by the jump starting device 10 to provide a normal operating mode (i.e. normal mode) or a Turbo Boost operating mode (i.e. Turbo mode or Turbo Boost mode). Specifically, the separate 12V battery is connected or connectable to the 12V relay 14A and the separate 12V battery in combination with the separate 4V battery is connected or connectable to the 16V relay 14B.

Operation

The jump starting device 10 is connected to the depleted or discharged battery 20, for example, using a positive battery cable having a positive battery clamp, and a negative battery cable having a negative battery clamp of the jump starting device 10.

During the normal operating mode (i.e. normal mode), for example, the 12V relay is closed by the controller and the 16V relay is opened by the controller. In this manner, electrical power is supplied from the battery cells 12A, 12B, 12C (CELLS #1, 2, 3) to the depleted or discharged battery 20.

During the Turbo Boost operating mode (i.e. Turbo mode or Turbo Boost mode), for example, the 12V relay is opened by the controller and the 16V relay is closed by the controller. In this manner, electrical power is supplied from the battery cells 12A, 12B, 12C, 12D (CELLS #1, 2, 3, 4) to the depleted or discharged battery 20.

It is noted that the controller and relays 14A, 14B can be differently configured and/or operated, however, still providing the same connections (i.e. closed relay) or disconnections (i.e. open relay) for selectively operating the normal operating mode and selectively operating the Turbo Boost operating mode.

Alternatively, the relay 14B can be connected to battery cell 12A (CELL #1) and relay 14A can be connected to battery cells 12B, 12C, 12D (CELLS #2, 3, 4) to also provide a 12V normal operating mode and a 16V Turbo Boost operating mode.

Relay Contact Detection

It is critical that the relays in FIG. 1 are never closed at the same time. A contact detector circuit can be provided to detect when either relay is closed for safety purposes.

Normal 12V Mode

In normal jump starter use, the jump starting device will operate in the 12V mode. This will allow the user to successfully jump start most vehicle applications. In this 12V mode, the jump starting device will power up in 12V mode. As stated above, this will allow the jump starting device to successfully jump start more vehicles in one charge.

16V Boost Mode

A separate "Turbo Boost" switch can be provided that when pressed, allows the 12V relay to be opened (if it is closed), and the 16V relay to then be closed for Turbo or Turbo Boost operation. This will provide the extra energy of the additional cell to provide a total of 16V for the jump start.

Charging

There are several embodiments for charging this system. FIG. 1 shows a charging method that includes two separate chargers, for example, one charger is a standard 12V charger and the second is an independent 4V cell charger. Another embodiment is a 16V charger and a separate 4V cell charger alone allowing cell balancing to help equalize the 4V cell to the rest of the 12V battery cells.

Dynamic Switching for Higher Power Jumpstarts

In another embodiment, the switch to higher energy enhanced mode (e.g. Turbo mode or Turbo Boost mode), can be dynamic. This allows for automatically switching to higher energy during the jump start event itself making it transparent to the user.

Timer

Turbo mode or Turbo Boost mode delivers current to the depleted or discharged battery (e.g. vehicle battery, car or truck battery), and unless it is limited by some function, will completely drain the higher battery that provides Turbo operation. One method of limiting is a simple timer. This timer can be programmed to vary depending on how long the current is provided.

Turbo Full Time

In another embodiment, a Turbo switch can be used to simply disable the Timer described above. This would have the effect of the Turbo mode or Turbo Boost mode being on full time until the boost battery reaches its low cutoff point.

The invention claimed is:

1. A jump starting device for boosting a depleted or discharged battery having a positive terminal and negative terminal, the jump starting device comprising:
   a first battery device;
   a second battery device;
   a positive battery connector for connecting a positive terminal of the first battery device or second battery to the positive terminal of the depleted or discharge battery;
   a negative battery connector for connecting a negative terminal of the first battery device or second battery device to the negative terminal of the depleted or discharged battery; and
   electronics in circuit with the first battery device, the second battery device, and the negative battery connector or the positive battery connector, the electronics configured for selectively connecting the first battery device to the depleted or discharged battery and disconnecting the second battery device from the depleted or discharged battery in a normal boost mode, or connecting the second battery device to the depleted or discharged battery and disconnecting the first battery device from the depleted or discharged battery in an enhanced boost mode.

2. The device according to claim 1, wherein the electronics comprises a first relay configured selectively connecting the first battery device to the depleted or discharged battery, and a second relay for selectively connecting the second battery device to the depleted or discharge battery to increase the voltage delivered to the depleted or discharged battery.

3. The device according to claim 2, further comprising a controller connected to and controlling the first relay and second relay for selectively connecting the first battery device to the depleted or discharge battery or the second battery device to the depleted or discharged battery.

4. The device according to claim 1, wherein the first battery device is a 12V battery pack having three (3) individual 4V battery cells and the second battery device is a 16V battery pack having four (4) individual 4V battery cells.

* * * * *